United States Patent
Michon

[15] 3,668,536
[45] June 6, 1972

[54] LIGHT AMPLIFIER STAGES

[72] Inventor: Maurice Michon, Draveil, France
[73] Assignee: Compagnie Generale D'Electricite, Paris, France
[22] Filed: Apr. 24, 1970
[21] Appl. No.: 31,634

[30] Foreign Application Priority Data
Apr. 24, 1969 France..................................6913114

[52] U.S. Cl..............................................330/4.3, 331/94.5
[51] Int. Cl..........................................................H01s 3/05
[58] Field of Search....................330/4.3; 332/7.51; 331/94.5

[56] References Cited
UNITED STATES PATENTS

| | | | |
|---|---|---|---|
| 3,453,559 | 7/1969 | Sharp et al. | 330/4.3 |
| 3,514,709 | 5/1970 | Jacob | 330/4.3 |
| 3,407,364 | 10/1968 | Turner | 330/4.3 |
| 3,533,015 | 10/1970 | Wuerker | 331/94.5 |
| 3,518,436 | 6/1970 | De Maria et al. | 331/94.5 |

Primary Examiner—Malcolm F. Hubler
Assistant Examiner—N. Moskowitz
Attorney—Sughrue, Rothwell, Mion, Zinn & Macpeak

[57] ABSTRACT

The present invention concerns light amplifier stages in which the provision of a fully reflecting surface at the end of a conventional amplifier stage causes it to produce an amplifying effect equivalent to plural conventional stages.

2 Claims, 3 Drawing Figures 3,668,536

1

LIGHT AMPLIFIER STAGES

BACKGROUND OF THE INVENTION

The present invention concerns laser light pulse amplification systems and more particularly the amplifier stages of these systems.

A laser amplifier system generally comprises a pilot laser, emitting a light pulse, associated with amplifier stages which enable, starting from the pulse emitted by the pilot laser, a high-power pulse to be obtained.

The pilot laser generally consists of an active laser bar associated with its pumping means, for example a discharge tube wound in a helical coil. The bar is arranged between two mirrors of a Perot-Fabry resonant cavity, one of the mirrors being semitransparent to enable one part of the laser emission to emerge from the cavity and the other being fully reflecting and capable of being driven in a rotational movement so as to obtain a triggered laser. The photon flux being emitted by the pilot laser penetrates into a bar deprived of its resonant cavity, forming the first stage of the amplifier system. The active medium, formed by a bar pumped, for example, by the light flash of a discharge lamp, produces an amplification of the pilot laser emission. This arrangement thus causes an appreciable power gain. Several amplifier stages can thus be arranged in series, the stimulated emission in the following stages being provoked by the photon flux coming from the preceding stages.

For medium-power amplifier systems, bars all having the same diameter and approximately the same length are used.

In lasers such as those described above, the light pulse passes only once through the active medium of each amplifier stage and all the stimulated mediums such as ions or molecules do not assist in producing the stimulated emission, thus a loss of the total output of the system ensues. Moreover, a laser system having a pilot laser and, for example, four amplifier stages, occupies a length of about three to four meters.

In connecting the pilot laser and the stages in series, it is essential, to avoid their being submitted to vibrations, to arrange them on an optical bench whose length is at least the same as that of the system. Such an optical bench generally consists of a single granite bar whose cross section is substantially a square about 1 centimeter which is very costly.

SUMMARY OF THE INVENTION

The object of the present invention is to overcome all of these disadvantages.

The present invention concerns a stage of a light pulse amplifier system characterized more particularly in that it comprises, arranged in the same light pulse propagation path and successively, starting from the input of the said stage, a selective two-state polarizer which is conductive or deflects a light pulse, depending upon the direction of its polarization plane, an active laser bar associated with its pumping means, a fully reflecting surface, and between the said selective polarizer and the said totally reflecting surface, a quarter-wave plate.

Other characteristics and advantages of the present invention will become apparent during the following description in relation to the annexed drawing as an illustrative example which is in no way limiting, in which:

BRIEF DESCRIPTION OF THE DRAWINGS

In FIG. 1, an amplifier system illustrating prior art is shown.

DETAILED DESCRIPTION OF THE INVENTION

Figure 1:
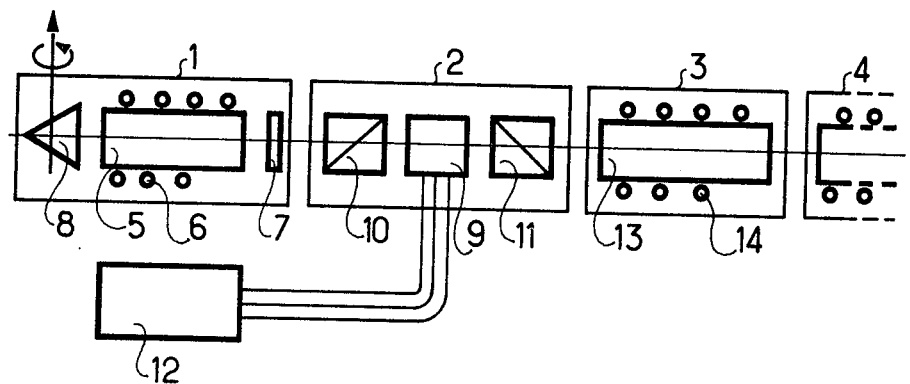
FIG. 1 shows an amplifier system according to prior art.

The amplifier system comprises, on a same optical axis, successively, a triggered pilot laser 1, a pulse splitting system 2 for reducing the duration of the pulse emitted by the pilot laser, which is generally in the order of 20 ns, to approximately 1 to 2 ns, and several amplifier stages such as those seen at 3 and 4.

2

The pilot laser 1 can consist, for example, of an active laser bar 5 surrounded by its discharge tube 6 arranged between a semitransparent mirror 7 and a fully reflecting prism 8 which can be driven in a rotational movement.

At the output of the pilot laser 1, the amplifier system comprises the pulse splitting system 2, which in itself, is known, comprising generally an electro-optical dephasing cell 9 such as, for example, a Pockels cell arranged between two crossed polarizers 10 and 11 which are generally Glan prisms.

The electro-optical cell can be controlled by a very short voltage pulse generated by a voltage generator 12.

The amplifier stages, which can be identical, consist of an active laser bar 13 associated with pumping means 14 which can be, for example, a discharge tube.

The operation of the system described above is as follows:

The pilot laser generates a light pulse which, when triggered by a prism, cannot go below 20 ns. The duration of this pulse is brought to a value in the order of a nanosecond by the pulse splitting system 2, whose operation is well known.

The group of photons which corresponds to the short-duration pulse, produces, on entering the first laser bar 13 of the stage 3 of the amplifier system, a first stimulated emission, then the amplified pulse leaving this first stage penetrates the bar of the second stage to produce further stimulated emission, and it is the same for all the stages of the amplifier system.

Thus, a pulse which has been appreciably amplified is obtained at the output of the system.

Figure 2:
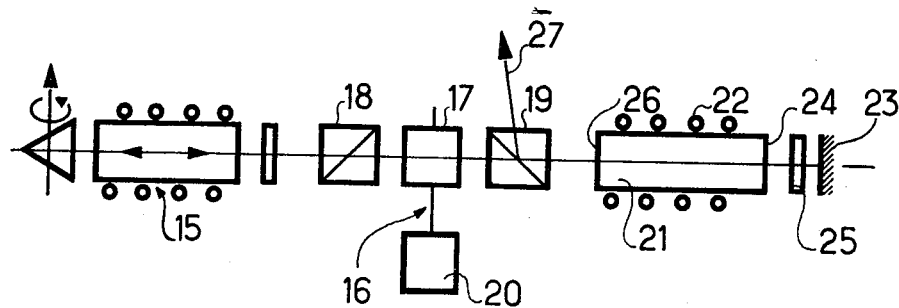
FIGS. 2 and 3 show two embodiments of a laser amplifier system comprising an amplifier stage according to the invention.
Figure 3:
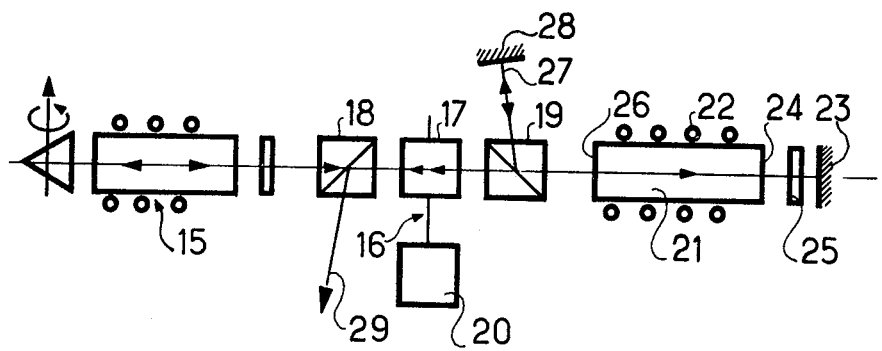

On the two FIGS. 2 and 3, showing two embodiments of an amplifier stage according to the invention, the same items bear the same reference numbers.

FIG. 2 shows a first embodiment of an amplifier system comprising an amplifier stage according to the invention associated with a pilot laser, this system being equivalent to a system having two distinct amplifier stages. The system comprises a pulse generator such as, for example, a pilot laser 15 triggered by a prism, associated with a pulse splitting device 16 comprising an electro-optical dephasing cell 17, such as for example, a Pockels cell, arranged between two crossed polarizers 18 and 19, the said pulse generator being arranged on the same optical axis, and in the direction of progression of a light-pulse. The crossed polarizers are devices generally consisting of optical crystals through which pass light beams which are rectilinearly polarized in a certain direction in relation to the optical axes of the crystals, but deflect rectilinearly polarized light beams whose polarization plane has a direction at right angles to the aforementioned light beams. These polarizers or other similar systems will be defined in the description as: selective polarizers having a conductive state and a deflecting state, depending upon the direction of the polarization plane of the light cooperating with them. The said two states which corresponds to two orthogonal directions of the light polarization plane. As previously, the electro-optical cell is controlled by a voltage pulse supplied by a generator 20.

An active laser bar 21 associated with its pumping means 22, for example, a flash lamp wound helically round this bar 21, and a fully reflecting surface 23 is arranged at the output of the pulse splitting device. For example, a quarter-wave plate 25, enabling the polarization plane of a wave to be rotated by ($\pi/2$) when this wave passes through the plate 25 twice, is arranged between the output face 24 of the bar 21 and the fully reflecting surface 23.

In this example, the quarter-wave plate is arranged between the bar and the fully reflecting prism, but it can also be arranged between the polarizer and the bar.

The operation of the system is as follows:

The duration of the light pulse generated by the pilot laser 17 is shortened by the pulse-splitting system 16 and the short pulse leaving the pulse-splitting system through the polarizer 19 is polarized rectilinearly, then it enters the bar 21 which is pumped by the flash of the flash lamp 22. This short pulse is thus amplified a first time. Then, after reflection on the prism 23, the pulse again crosses the bar which is still partially stimulated but having, in the process, crossed the quarter-wave plate 25 twice, this having resulted in the rotation by ($\pi/2$) of the polarization plane. When the light leaves the bar through the face 26 of the bar 21 and falls onto the polarizer 19, the light whose polarization plane direction crossed by the conductive direction of the polarizer is deflected from the axis of the system and emerges from the latter at 27.

Therefore, according to the device described above, an amplifier system almost equivalent to a system comprising two amplifier stages, since the pulse has twice crossed a stimulated active bar, has been obtained.

As the light pulse crosses the same bar twice, a maximum of pumping energy has been converted into amplifying energy and has contributed to increasing the output of a single amplifier stage.

In this embodiment, the amplifier stage which is twice crossed by a light pulse to be amplified consists of the polarizer 19, the active medium 21, the quarter-wave plate 25 and the prism 23, but in the case where the amplifier system comprises a pulse-splitting system consisting of an electro-optical cell arranged between two crossed polarizers, the output polarizer of the pulse-splitting system can coincide with the polarizer which is built into the amplifier stage, this being one of the advantages of the invention.

FIG. 3 shows a second embodiment of an amplifier system comprising an amplifier stage according to the invention which is substantially equivalent to a system having four amplifier stages.

The system according to FIG. 3 comprises the same elements as before, but a fully reflecting mirror 28 is arranged in the path of the light beam deviated at 27 by the polarizer 19.

The operation of that amplifier system is as follows:

The first phase of operation is, in all respects, identical to the operation as described above in the first embodiment. The light pulse is deviated by the polarizer 19 and sent through the bar 21 after having been reflected on the mirror 28 and having been deviated once again by the polarizer 19, the light pulse plane of polarization having no definite direction.

The pulse therefore crosses the bar twice more; it also crosses the quarter-wave plate 25 twice more, its plane of polarization therefore undergoes a further rotation by ($\pi/2$) and consequently, the pulse emerging for the second time from the bar 21 through the face 26 crosses the polarizer 19, without being deflected, as well as the electro-optical cell 17, since during that time, the voltage pulse controlling that cell has fallen back to its zero value. The pulse arriving on the selective polarizer 18 is deflected from its path to be ejected from the system at 29 since this polarizer 18 is crossed in relation to the polarizer 19. In this case, an amplifier system substantially equivalent to a system comprising four stages in series and an increase in the output of a single stage have been obtained.

Of course, the invention is in no way limited to the embodiment described and illustrated, which has been given only by way of example. More particularly, details may be modified and certain arrangements may be changed or certain means may be replaced by equivalent means.

I claim:

1. An amplifier stage for use in a light amplification system, wherein the light to be amplified consists of a beam of light generated in a direction along a first axis, said amplification stage comprising:
   a. a first selective polarizer means positioned along said first axis for conducting, in a direction along said first axis, light polarized in a first plane and for deflecting, in a direction along a second axis, light polarized in a second plane wherein said first and second planes are perpendicular;
   b. an electro-optical dephasing cell positioned along said first axis;
   c. a second selective polarizer means positioned along said axis for conducting, in a direction along said first axis, light polarized in said first plane and for deflecting, in a direction along a third axis, light polarized in said second plane;
   d. an active laser bar and a pumping means associated therewith positioned along said first axis;
   e. a first fully reflective means positioned along said first axis for reflecting a beam from said laser bar back through said laser bar in the opposite direction along said first axis; and
   f. a second fully reflective means positioned along said third axis for reflecting light deflected by said second selective polarizer means in the opposite direction along said third axis.

2. An amplifier stage as recited in claim 1 in which said electro-optical cell is a Pockels cell.

* * * * *